(No Model.) 2 Sheets—Sheet 1.
A. W. BUTT.
CULTIVATOR.
No. 445,846. Patented Feb. 3, 1891.
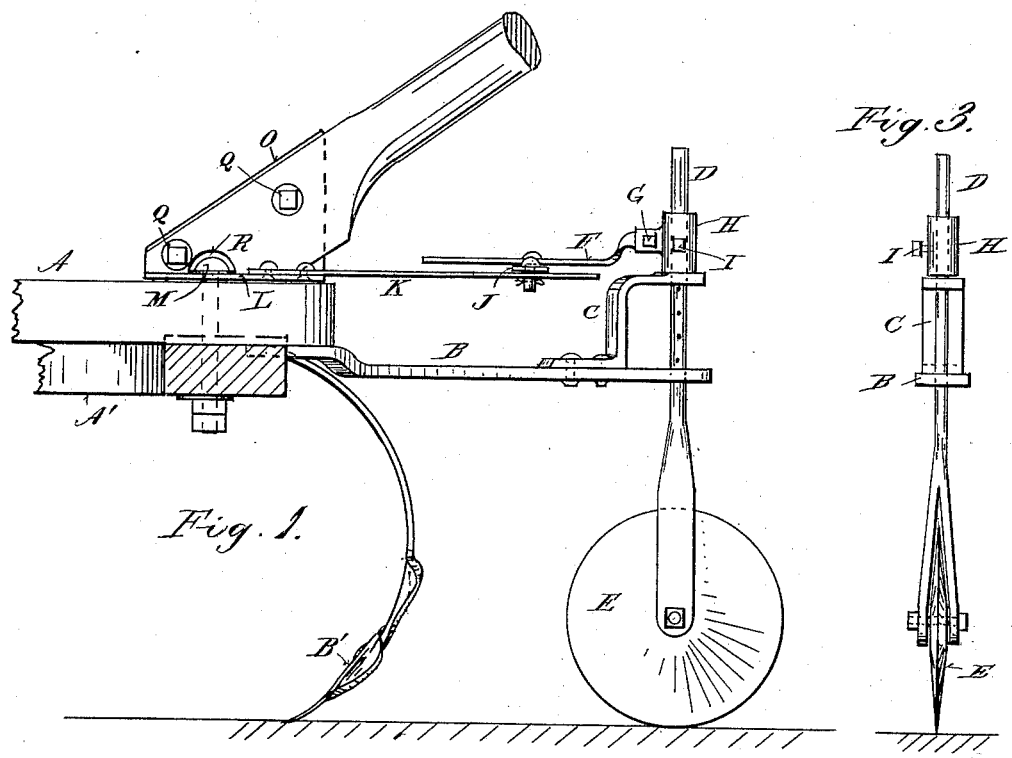
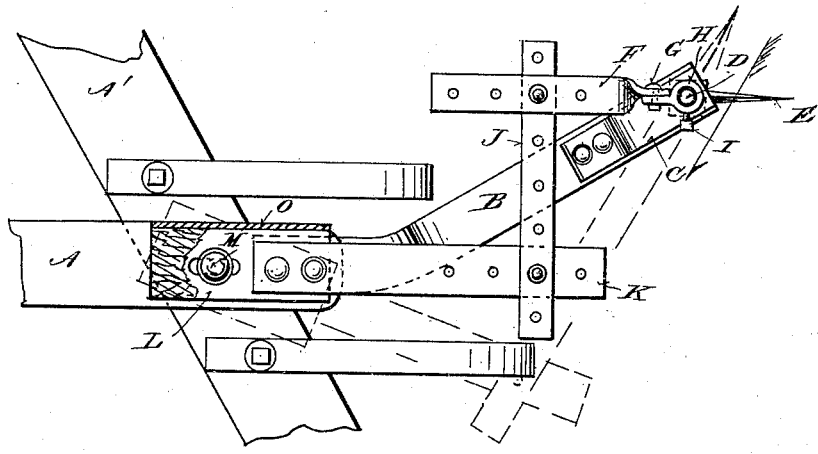
WITNESSES
H. M. Plassed.
Warren Hull.
INVENTOR
A. W. Butt,
By H. A. Toulmin,
his Attorney.

(No Model.) 2 Sheets—Sheet 2.

A. W. BUTT.
CULTIVATOR.

No. 445,846. Patented Feb. 3, 1891.

WITNESSES
H. M. Plaisted
Warren Hull

INVENTOR
A. W. Butt,
By H. A. Toulmin
his Attorney.

UNITED STATES PATENT OFFICE.

ADDISON W. BUTT, OF SPRINGFIELD, OHIO.

CULTIVATOR.

SPECIFICATION forming part of Letters Patent No. 445,846, dated February 3, 1891.

Application filed August 16, 1890. Serial No. 362,153. (No model.)

*To all whom it may concern:*

Be it known that I, ADDISON W. BUTT, a citizen of the United States, residing at Springfield, in the county of Clark and State of Ohio, have invented certain new and useful Improvements in Cultivators, of which the following is a specification, reference being had therein to the accompanying drawings.

This invention relates to certain new and useful improvements in cultivators, and my improvements are applicable to various kinds of cultivators, such as straddle-row walking-cultivators, straddle-row riding-cultivators, non-parallel beam cultivators, and parallel-beam cultivators.

The object of my invention is to provide mechanism for accomplishing what is known as the "lateral adjustment" or "swinging" of the cultivator-beam or drag-bar out of the ground, whereby the present laborious operation of the plowman in elevating the rear ends of the cultivator-beam or drag-bar and swinging them from side to side to accommodate the sinuosities of the rows and to clear the shovels of accumulations may be accomplished without the labor of so elevating the beams, and this in a ready, reliable, and easy manner.

Figure 4:
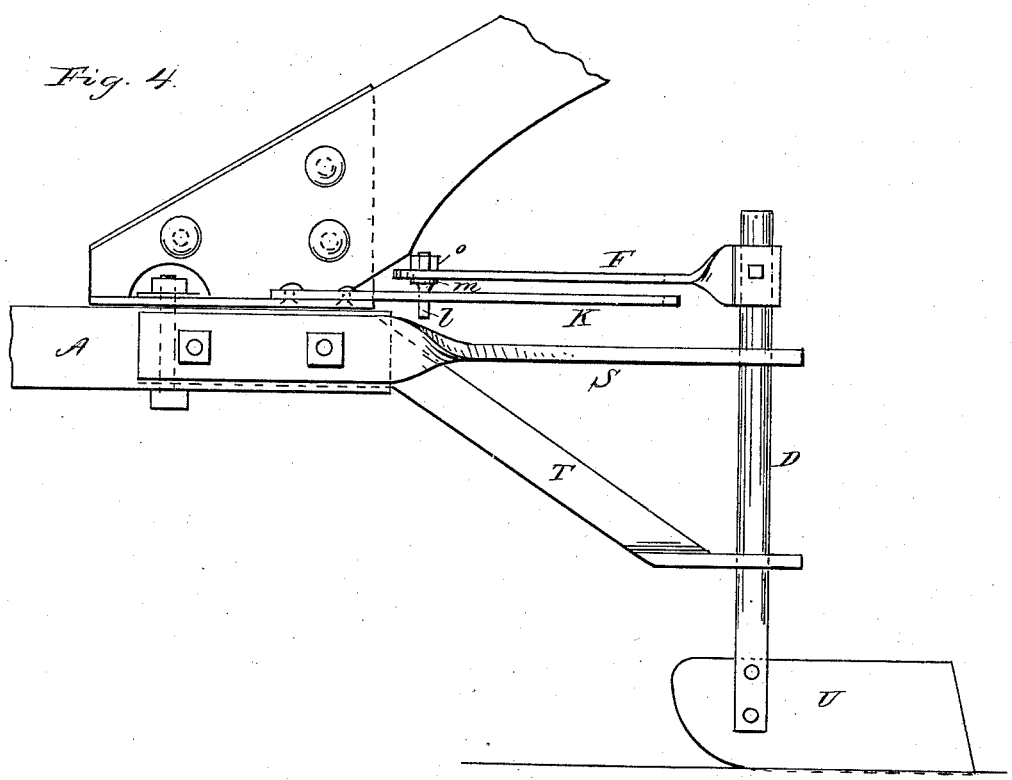
Figure 5:
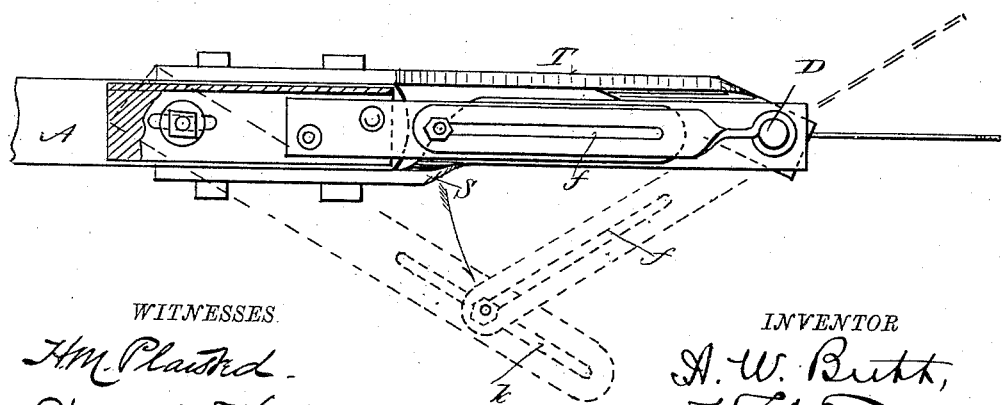

In the accompanying drawings, forming a part of this specification, and on which like reference-letters indicate corresponding parts, Figure 1 represents a side elevation of the rear end of a cultivator-beam, a portion of the handle and a tooth, and the preferred type of my improved steering or deflecting mechanism; Fig. 2, a plan view of the part shown in Fig. 1 with the handle removed; Fig. 3, a detail rear elevation of the deflecting mechanism proper; Fig. 4, a similar view to Fig. 1, showing a modified form of deflecting mechanism; and Fig. 5, a plan view of what is shown in Fig. 4, save that the handle is removed.

The letter A designates a cultivator-beam or drag-bar of the usual or any approved type, the same being coupled, as is well known, to a wheeled vehicle, by which such drag bar or beam is drawn through the field. The articulation of the beam to the wheeled vehicle, as is also well known, admits of vertically and laterally adjusting the beam. The beam is adjusted vertically to elevate the shovels out of the ground and to let them down into the soil. It is adjusted laterally to meet the sinuosities or positions of the various plants, which usually stand more or less out of a right line. It is also adjusted laterally or shaken back and forth to relieve the shovels of the accumulation of trash, weeds, &c. With such a beam I combine my steering, guiding, or deflecting mechanism. I will first describe the preferred type of this mechanism. This consists of a stout bar B, secured to the under side of the rear end of the beam and extending rearwardly a convenient distance, where it is provided with an arm or bracket C, which, together with the bar, constitutes a proper bearing for a vertical shaft D. This shaft is bifurcated at its lower end and adapted to straddle a disk or wheel E. The shaft of said disk or wheel E is mounted in said bifurcations or yokes, so that the wheel is properly held and may freely rotate. This shaft acts like a rudder-post, and the wheel or disk like a rudder. To accomplish such action a tiller F is secured to the shaft— say by bolting or pivoting it at G to a sleeve H, held to the shaft by a set-screw I. It will be seen from Fig. 2 that the disk and shaft stand to one side of the beam by reason of the deflection of the bar B. A suitable connection is made between the handle and the tiller to enable the operator to manipulate the tiller through the handle. Such connection is preferably made by means of a link J, having a series of holes to adapt it to be connected at different points with the tiller, which itself has a series of holes, with either of which the link may be pivotally connected. The other end of the link is similarly connected through either one or the other of its holes with one or the other of a series of holes in a plate K. This plate is rigidly connected with a shoe or seat L, pivotally connected with the rear end of the beam. A bolt M passing through an opening in the shoe and into the beam constitutes a pivot. The shoe preferably has a wall O extending up at one side and flanged over to fit upon the handle. The handle is fashioned to fit the shoe, and is suitably held by bolts or rivets Q, and is recessed at R to clear the head of the bolt M. Thus it will be seen that the handle is practically mounted on a pivot, whereby it may be swung laterally at its rear end. This manipulation of the handle will turn the shaft D one way or the other, and consequently turn or deflect the disk or wheel E so that it will progress through the soil as the machine advances at an angle to the line of draft, and thus carry the beam with it in a lateral direction until deflected to the opposite position, when it will carry the beam back toward and to or beyond the line of draft in the direction of the other extreme. The degree or distance that the beam is swung laterally and the rapidity with which it is so swung will of course depend upon the manipulations and angularity given to the deflecting mechanism. Such manipulations are governed by the desire of the plowman and the necessities of the work he is about.

Referring to Fig. 4, it will be seen that while I have maintained the same form of connection between the handle, the shoe, and the beam, and have provided the shoe with a similar plate K and the shaft D with a similar tiller F, I have omitted the link J and changed the construction of the bars which connect the shaft with the beam.

At S is represented a bar secured to the inside of the beam and supporting the upper end of the shaft D, and at T is represented a similar bar secured to the opposite side of the beam and supporting the shaft nearer to its lower end. A runner U is substituted for the wheel or disk as the guiding or deflecting means proper. In the forms shown in Figs. 4 and 5, however, the location of the shaft D is directly behind the beam instead of to one side of it, and the tiller is slotted, as seen at $f$, and the plate K is also slotted, as seen at $k$. A stud $l$ is passed through the slot $k$ and firmly secured to the tiller at different points in the slot $f$, according to the degree of angularity to which it may be desired to adjust the runner U or the wheel E, as the case may be. These forms of deflecting device proper may be interchangeably used with either of the organizations shown in Figs. 1, 2, and 3 and 4 and 5, respectively. The stud $l$ is shouldered at $m$ and has a nut $o$, which secures it.

I have already stated that I do not wish to be understood as limiting myself to the particular organizations or forms of construction so long as the fundamental principle of my invention be preserved. I have also stated and wish it distinctly understood that the steering or deflecting mechanism may be used in connection with what is known in the market as the "parallel-beam" or "non-parallel-beam" cultivator. I also prefer that the deflector proper shall be operated by a pivotally-mounted handle through intermediate devices, but do not limit myself to such a means of operating the deflecting device.

I have illustrated the beam A as of a non-parallel-beam type, and have shown connected to it an oblique toothed bar A', to which the spring-tooth B' or any other form of tooth may be secured. For convenience the bolt M' passes through the bar A' to assist in holding it to the beam A'.

Referring to the matter of causing the rudder or deflector to more or less readily move the beam laterally, I would observe that this matter is controlled by the position of the stud $l$ with respect to the shaft D and the pivot-bolt M. (Shown in Figs. 4 and 5.) To illustrate, by placing the stud $l$ near to the rear end of the plate K it will move more rapidly than if nearer to the bolt M and will also act more quickly upon the shaft D, because it will be in such position nearer to the shaft. The same is true in principle in the construction shown in Figs. 1 and 2. If the link J be connected near the outer end of the plate K, it will move more quickly by a deflection of the handle than if placed nearer the pivot-bolt M. Then, too, the link J being pivoted to the tiller F near the shaft D will act more quickly upon this shaft, and hence turn the rudder or deflector more quickly. Now, on the other hand, if the position of the stud $l$ and the connection of the link J with the tiller and plate K be nearer to the pivot-bolt M and farther from the shaft the action will be slower and the wheel or rudder will not deflect so quickly by a movement of the handle. The rudder or deflector may be incidentally used as a means of limiting the depth that the shovels shall run. It will also be observed that the instrumentalities I have shown and described for operating the deflector or rudder are such that when the handle is moved outward, as is customary by plowmen when they desire to move a beam outward, the rudder or deflector will assume a proper position to move the beam outward. On the other hand, when the handle is manipulated to move the beam inward, as is also customary by my device, the rudder or deflector is likewise manipulated so as to move the beam inward. The result of this is that the old action of plowmen in moving the beams laterally is adhered to in manipulating my device. I do not wish to be confined to this mode of action, but prefer it.

Having thus fully described my invention, what I claim as new, and desire to secure by Letters Patent, is—

1. The combination, with a laterally-swinging beam and cultivator-teeth carried thereby and adapted to be readily moved laterally with the said beam, of a steerer connected to the beam to deflect the beam laterally, a handle, and intermediate devices between the handle and the steerer having the mode of operation described, whereby the beam is deflected in the same direction that the handle is moved by the plowman.

2. The combination, with a laterally-swinging beam, cultivator-teeth carried thereby adapted to be readily moved laterally with said beam, and a handle pivoted to said beam, of a steerer consisting of a pivoted deflector proper connected to said beam and having a lever-arm, and a link-connection between said arm and said handle, whereby a movement of the handle to the right or left will cause the steerer to deflect the beam in the same direction.

3. The combination, with a laterally-swinging beam or drag-bar, of a shoe pivotally mounted upon the same, a handle and a plate carried by the shoe, a bar secured to the beam, a shaft mounted in said bar, a tiller mounted on said shaft and connected with the plate carried by the shoe, and a deflector or rudder carried by the shaft.

4. The combination, with a laterally-swinging beam or drag-bar, a shoe pivotally mounted upon the same, a handle and a plate carried by the shoe a bar secured to the beam, a bifurcated shaft mounted in the bar, and a wheel or disk mounted in the bifurcations, of a tiller secured to the shaft and a link connecting the tiller to the plate.

In testimony whereof I affix my signature in presence of two witnesses.

ADDISON W. BUTT.

Witnesses:
OLIVER H. MILLER,
WARREN HULL.